United States Patent
Harris, Jr. et al.

(10) Patent No.: US 8,636,471 B2
(45) Date of Patent: Jan. 28, 2014

(54) APPARATUS AND METHODS FOR COOLING PLATFORM REGIONS OF TURBINE ROTOR BLADES

(75) Inventors: John Wesley Harris, Jr., Taylors, SC (US); Craig Allen Bielek, Simpsonville, SC (US); Scott Edmond Ellis, Easley, SC (US); Daniel Alan Hynum, Simpsonville, SC (US); Melissa Ann Seely, Taylors, SC (US); Xiaoyong Fu, Greer, SC (US)

(73) Assignee: General Electric Company, Schenectady, NY (US)

( * ) Notice: Subject to any disclaimer, the term of this patent is extended or adjusted under 35 U.S.C. 154(b) by 617 days.

(21) Appl. No.: 12/972,835

(22) Filed: Dec. 20, 2010

(65) Prior Publication Data

US 2012/0156055 A1 Jun. 21, 2012

(51) Int. Cl.
*F01D 5/18* (2006.01)
*F01D 5/08* (2006.01)

(52) U.S. Cl.
USPC .. 416/97 R; 416/193 A; 415/115; 29/889.721

(58) Field of Classification Search
USPC ............. 416/97 R, 96 R, 97 A, 96 A, 193 A; 415/115; 29/889.7, 889.721
See application file for complete search history.

(56) References Cited

U.S. PATENT DOCUMENTS

| | | |
|---|---|---|
| 3,950,114 A | 4/1976 | Helms |
| 4,312,625 A * | 1/1982 | Pinaire ........................ 416/96 R |
| 4,712,979 A | 12/1987 | Finger |
| 4,798,514 A | 1/1989 | Pask |
| 5,340,278 A | 8/1994 | Magowan |
| 5,382,135 A | 1/1995 | Green |
| 5,639,216 A * | 6/1997 | McLaurin et al. .............. 416/95 |
| 5,813,835 A | 9/1998 | Corsmeier et al. |
| 5,993,155 A * | 11/1999 | Endres et al. ................ 416/96 R |
| 6,017,189 A * | 1/2000 | Judet et al. ................... 416/97 R |
| 6,017,819 A | 1/2000 | Brigham et al. |
| 6,019,579 A | 2/2000 | Fukuno et al. |
| 6,120,249 A | 9/2000 | Hultgren et al. |
| 6,190,130 B1 | 2/2001 | Fukue et al. |
| 6,196,799 B1 | 3/2001 | Fukue et al. |
| 6,402,417 B1 | 6/2002 | Okamoto |
| 6,431,833 B2 | 8/2002 | Jones |
| 6,478,540 B2 | 11/2002 | Abuaf et al. |
| 7,097,424 B2 | 8/2006 | Cunha et al. |
| 7,147,439 B2 | 12/2006 | Jacala et al. |
| 7,198,467 B2 | 4/2007 | Keith et al. |
| 7,309,212 B2 * | 12/2007 | Itzel et al. ................. 416/193 A |
| 7,347,664 B2 | 3/2008 | Kayser et al. |
| 7,416,391 B2 | 8/2008 | Veltre et al. |
| 8,444,381 B2 * | 5/2013 | Seely ................................ 416/1 |
| 2006/0056968 A1 | 3/2006 | Jacala et al. |
| 2007/0189896 A1 | 8/2007 | Itzel et al. |

* cited by examiner

*Primary Examiner* — Igor Kershteyn
(74) *Attorney, Agent, or Firm* — Mark E. Henderson; Ernest G. Cusick; Frank A. Landgraff

(57) ABSTRACT

A configuration of cooling channels through the interior of a turbine rotor blade, the turbine rotor blade including a platform at an interface between an airfoil and a root. In one embodiment, the configuration of cooling channels includes: an interior cooling passage that is configured to extend from a connection with a coolant source in the root to the interior of the airfoil; a platform cooling channel that traverses at least a portion of the platform; a turndown extension that includes a first section, which comprises a connection with the platform cooling channel, and a second section, which comprises a radially oriented cooling channel; and a connector that extends from a connector opening formed through an outer face of the root to a connection with the interior cooling passage and, therebetween, bisects the second section of the turndown extension.

26 Claims, 8 Drawing Sheets

# US 8,636,471 B2

1

APPARATUS AND METHODS FOR COOLING PLATFORM REGIONS OF TURBINE ROTOR BLADES

BACKGROUND OF THE INVENTION

The present application relates generally to combustion turbine engines, which, as used herein and unless specifically stated otherwise, includes all types of combustion turbine engines, such as those used in power generation and aircraft engines. More specifically, but not by way of limitation, the present application relates to apparatus, systems and/or methods for cooling the platform region of turbine rotor blades.

A gas turbine engine typically includes a compressor, a combustor, and a turbine. The compressor and turbine generally include rows of airfoils or blades that are axially stacked in stages. Each stage typically includes a row of circumferentially spaced stator blades, which are fixed, and a set of circumferentially spaced rotor blades, which rotate about a central axis or shaft. In operation, the rotor blades in the compressor are rotated about the shaft to compress a flow of air. The compressed air is then used within the combustor to combust a supply of fuel. The resulting flow of hot gases from the combustion process is expanded through the turbine, which causes the rotor blades to rotate the shaft to which they are attached. In this manner, energy contained in the fuel is converted into the mechanical energy of the rotating shaft, which then, for example, may be used to rotate the coils of a generator to generate electricity.

Referring to FIGS. 1 and 2, turbine rotor blades 100 generally include an airfoil portion or airfoil 102 and a root portion or root 104. The airfoil 102 may be described as having a convex suction face 105 and a concave pressure face 106. The airfoil 102 further may be described as having a leading edge 107, which is the forward edge, and a trailing edge 108, which is the aft edge. The root 104 may be described as having structure (which, as shown, typically includes a dovetail 109) for affixing the blade 100 to the rotor shaft, a platform 110 from which the airfoil 102 extends, and a shank 112, which includes the structure between the dovetail 109 and the platform 110.

As illustrated, the platform 110 may be substantially planar. (Note that "planar," as used herein, means approximately or substantially in the shape of a plane. For example, one of ordinary skill in the art will appreciate that platforms may be configured to have an outboard surface that is slight curved and convex, with the curvature corresponding to the circumference of the turbine at the radial location of the rotor blades. As used herein, this type of platform shape is deemed planar, as the radius of curvature is sufficiently great to give the platform a flat appearance.) More specifically, the platform 110 may have a planar topside 113, which, as shown in FIG. 1, may include an axially and circumferentially extending flat surface. As shown in FIG. 2, the platform 110 may have a planar underside 114, which may also include an axially and circumferentially extending flat surface. The topside 113 and the bottom side 114 of the platform 110 may be formed such that each is substantially parallel to the other. As depicted, it will be appreciated that the platform 110 typically has a thin radial profile, i.e., there is a relatively short radial distance between the topside 113 and the bottom side 114 of the platform 110.

In general, the platform 110 is employed on turbine rotor blades 100 to form the inner flow path boundary of the hot gas path section of the gas turbine. The platform 110 further provides structural support for the airfoil 102. In operation, the rotational velocity of the turbine induces mechanical loading that creates highly stressed regions along the platform 110 that, when coupled with high temperatures, ultimately cause the formation of operational defects, such as oxidation, creep, low-cycle fatigue cracking, and others. These defects, of course, negatively impact the useful life of the rotor blade 100. It will be appreciated that these harsh operating conditions, i.e., exposure to extreme temperatures of the hot gas path and mechanical loading associated with the rotating blades, create considerable challenges in designing durable, long-lasting rotor blade platforms 110 that both perform well and are cost-effective to manufacture.

One common solution to make the platform region 110 more durable is to cool it with a flow of compressed air or other coolant during operation, and a variety of these type of platform designs are known. However, as one of ordinary skill in the art will appreciate, the platform region 110 presents certain design challenges that make it difficult to cool in this manner. In significant part, this is due to the awkward geometry of this region, in that, as described, the platform 110 is a periphery component that resides away from the central core of the rotor blade and typically is designed to have a structurally sound, but thin radial thickness.

To circulate coolant, rotor blades 100 typically include one or more hollow interior cooling passages 116 (see FIGS. 3, 4 and 5) that extend radially through the interior of the blade 100, including through the root 104 and the airfoil 102. As described in more detail below, to increase the exchange of heat, such interior cooling passages 116 may be formed having a serpentine path that winds through the central regions of the blade 100, though other configurations are possible. In operation, a coolant may enter the interior cooling passage via one or more inlets 117 formed in the inboard surface of the dovetail 109. The coolant may circulate through the blade 100 and exit through outlets (not shown) formed on the airfoil and/or via one or more outlets (not shown) formed in the root 104. The coolant may be pressurized, and, for example, may include pressurized air, pressurized air mixed with water, steam, and the like. In many cases, the coolant is compressed air that is diverted from the compressor of the engine, though other sources are possible. As discussed in more detail below, these interior cooling passages typically include a high-pressure coolant region and a low-pressure coolant region. The high-pressure coolant region typically corresponds to an upstream portion of the cooling passage that has a higher coolant pressure, whereas the low-pressure coolant region corresponds to a downstream portion having a relatively lower coolant pressure.

In some cases, the coolant may be directed from the interior cooling passages 116 into a cavity 119 formed between the shanks 112 and platforms 110 of adjacent rotor blades 100. From there, the coolant may be used to cool the platform region 110 of the blade, a conventional design of which is presented in FIG. 3. This type of design typically extracts air from one of the interior cooling passages 116 and uses the air to pressurize the cavity 119 formed between the shanks 112/ platforms 110. Once pressurized, this cavity 119 then supplies coolant to cooling channels that extend through the platforms 110. After traversing the platform 110, the cooling air may exit the cavity through film cooling holes formed in the topside 113 of the platform 110.

It will be appreciated, however, that this type of conventional design has several disadvantages. First, the cooling circuit is not self-contained in one part, as the cooling circuit is only formed after two neighboring rotor blades 100 are assembled. This adds a great degree of difficulty and complexity to installation and pre-installation flow testing. A second disadvantage is that the integrity of the cavity 119 formed between adjacent rotor blades 100 is dependent on how well the perimeter of the cavity 119 is sealed. Inadequate sealing may result in inadequate platform cooling and/or wasted cooling air. A third disadvantage is the inherent risk that hot gas path gases may be ingested into the cavity 119 or the platform itself 110. This may occur if the cavity 119 is not maintained at a sufficiently high pressure during operation. If the pressure of the cavity 119 falls below the pressure within the hot gas path, hot gases will be ingested into the shank cavity 119 or the platform 110 itself, which typically damages these components as they were not designed to endure exposure to the hot gas-path conditions.

FIGS. 4 and 5 illustrate another type of conventional design for platform cooling. In this case, the cooling circuit is contained within the rotor blade 100 and does not involve the shank cavity 119, as depicted. Cooling air is extracted from one of the interior cooling passages 116 that extend through the core of the blade 100 and directed aft through cooling channels formed within the platform 110 (i.e., "platform cooling channels 120"). As shown by the several arrows, the cooling air flows through the platform cooling channels 120 and exits through outlets in the aft edge 121 of the platform 110 or from outlets disposed along the suction side edge 122. (Note that in describing or referring to the edges or faces of the rectangular platform 110, each may be delineated based upon its location in relation to the suction face 105 and pressure face 106 of the airfoil 102 and/or the forward and aft directions of the engine once the blade 100 is installed. As such, as one of ordinary skill in the art will appreciate, the platform may include an aft edge 121, a suction side edge 122, a forward edge 124, and a pressure side edge 126, as indicated in FIGS. 3 and 4. In addition, the suction side edge 122 and the pressure side edge 126 also are commonly referred to as "slashfaces" and the narrow cavity formed therebetween once neighboring rotor blades 100 are installed may be referred to as a "slashface cavity".)

It will be appreciated that the conventional designs of FIGS. 4 and 5 have an advantage over the design of FIG. 3 in that they are not affected by variations in assembly or installation conditions. However, conventional designs of this nature have several limitations or drawbacks. First, as illustrated, only a single circuit is provided on each side of the airfoil 102 and, thus, there is the disadvantage of having limited control of the amount of cooling air used at different locations in the platform 110. Second, conventional designs of this type have a coverage area that is generally limited. While the serpentine path of FIG. 5 is an improvement in terms of coverage over FIG. 4, there are still dead areas within the platform 110 that remain uncooled. Third, to obtain better coverage with intricately formed platform cooling channels 120, manufacturing costs increase dramatically, particularly if the cooling channels having shapes that require a casting process to form. Fourth, these conventional designs typically dump coolant into the hot gas path after usage and before the coolant is completely exhausted, which negatively affects the efficiency of the engine. Fifth, conventional designs of this nature generally have little flexibility. That is, the channels 120 are formed as an integral part of the platform 110 and provide little or no opportunity to change their function or configuration as operating conditions vary. These types of conventional designs are difficult to repair or refurbish.

In addition, as one of ordinary skill in the art will appreciate, another challenge associated with these types of cooling arrangements is connecting the platform cooling circuit, i.e., the interior cooling passages formed through the interior of the platform to the main cooling circuit, i.e., the interior cooling passages formed through the interior of the root and airfoil. One reason for this is that the connection required typically must be formed through a high-stress region of the blade. Another relates to the advantages associated with having the core of the platform cooling circuit remain unconnected to the core of the main cooling circuit during the casting process. For example, typically the platform cooling circuit has tight tolerance requirements associated with the placement of the interior cooling passages in relation to the outer surface of the platform. Because of its length, the core of the main cooling circuit is apt to move when the mold is filled during the casting process. This movement, while acceptable for the placement of the main cooling circuit, makes it difficult to satisfy the tight placement tolerances of the platform cooling circuit if the movement of the main core is translated to the platform core. Having the two cores remain unconnected through the casting process means the movement of the main core does not affect the ultimate placement of the platform cooling circuit. Of course, this requires that a post-cast connection be made. Being a region of high stress, this connection must be formed such that structural integrity is maintained.

Conventional platform cooling designs fail to satisfy these important requirements. There remains a need for improved apparatus, systems, and methods that effectively cool the platform region of turbine rotor blades in an efficient manner, while also being cost-effective to construct, flexible in application, structurally sound, and durable.

BRIEF DESCRIPTION OF THE INVENTION

The present application thus describe a configuration of cooling channels through the interior of a turbine rotor blade, the turbine rotor blade including a platform at an interface between an airfoil and a root. In one embodiment, the configuration of cooling channels includes: an interior cooling passage that is configured to extend from a connection with a coolant source in the root to the interior of the airfoil; a platform cooling channel that traverses at least a portion of the platform; a turndown extension that includes a first section, which comprises a connection with the platform cooling channel, and a second section, which comprises a radially oriented cooling channel; and a connector that extends from a connector opening formed through an outer face of the root to a connection with the interior cooling passage and, therebetween, bisects the second section of the turndown extension.

A method of manufacturing a configuration of cooling channels through the interior of a turbine rotor blade, the turbine rotor blade having a platform at an interface between an airfoil and a root. In one embodiment, the method includes the steps of: forming an interior cooling passage that is configured to extend from a connection with a coolant source in the root to the interior of the airfoil; forming a platform cooling channel that traverses at least a portion of the platform; forming a turndown extension that comprises a first section, which forms a connection with the platform cooling channel, and a second section, which comprises a radially oriented cooling channel; and forming a connector that extends from an opening formed through an outer face of the root to a connection with the interior cooling passage and, therebetween, bisects the second section of the turndown extension.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
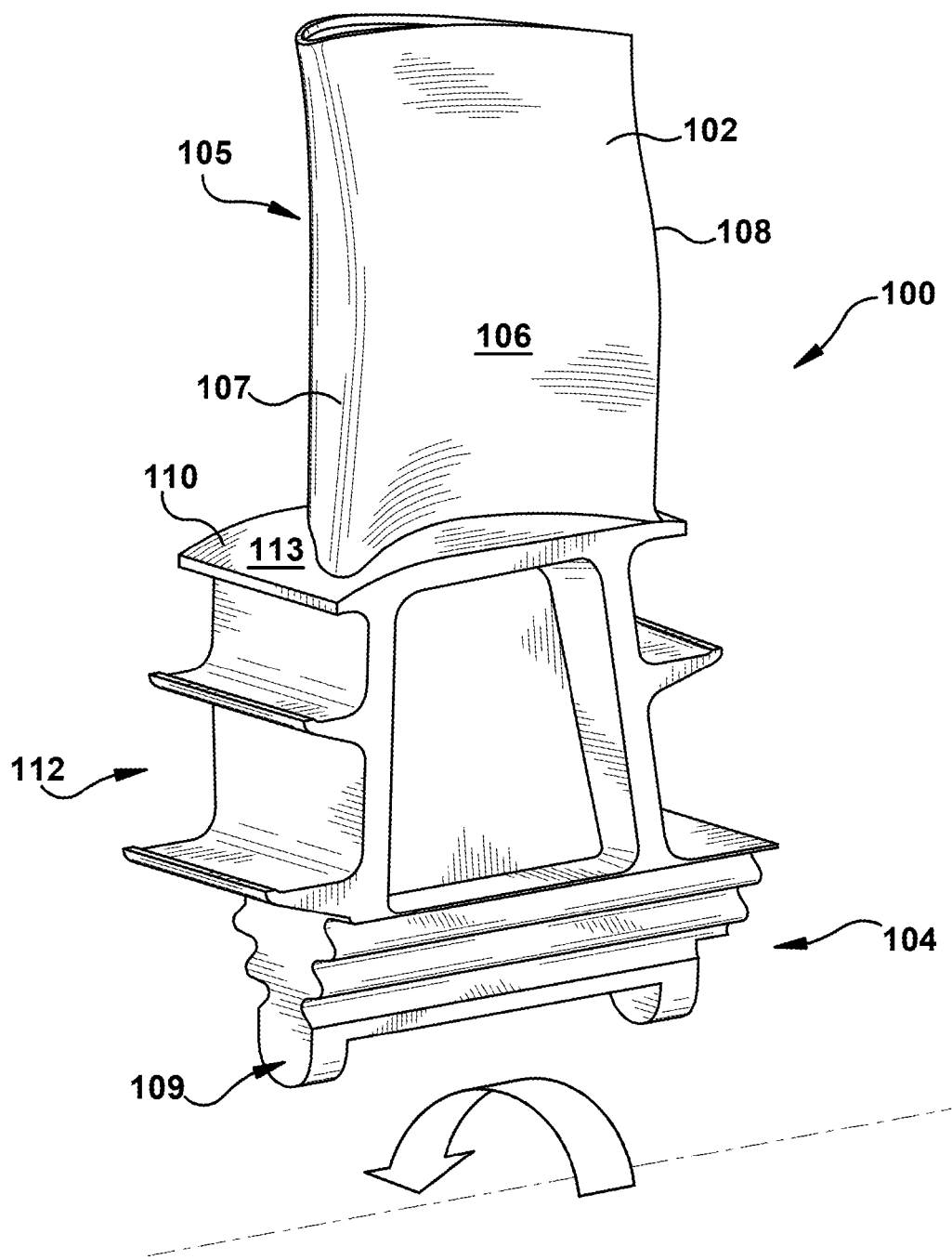
FIG. 1 illustrates a perspective view of an exemplary turbine rotor blade in which embodiments of the present invention may be employed.
Figure 2:
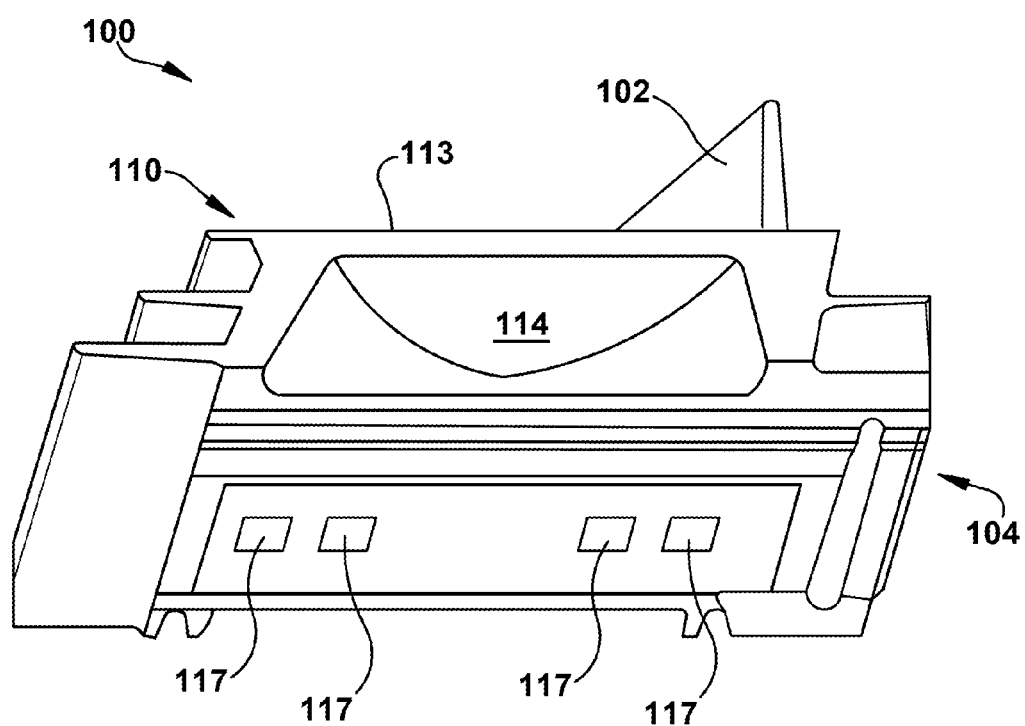
FIG. 2 illustrates an underside view of a turbine rotor blade in which embodiments of the present invention may be used.
Figure 3:
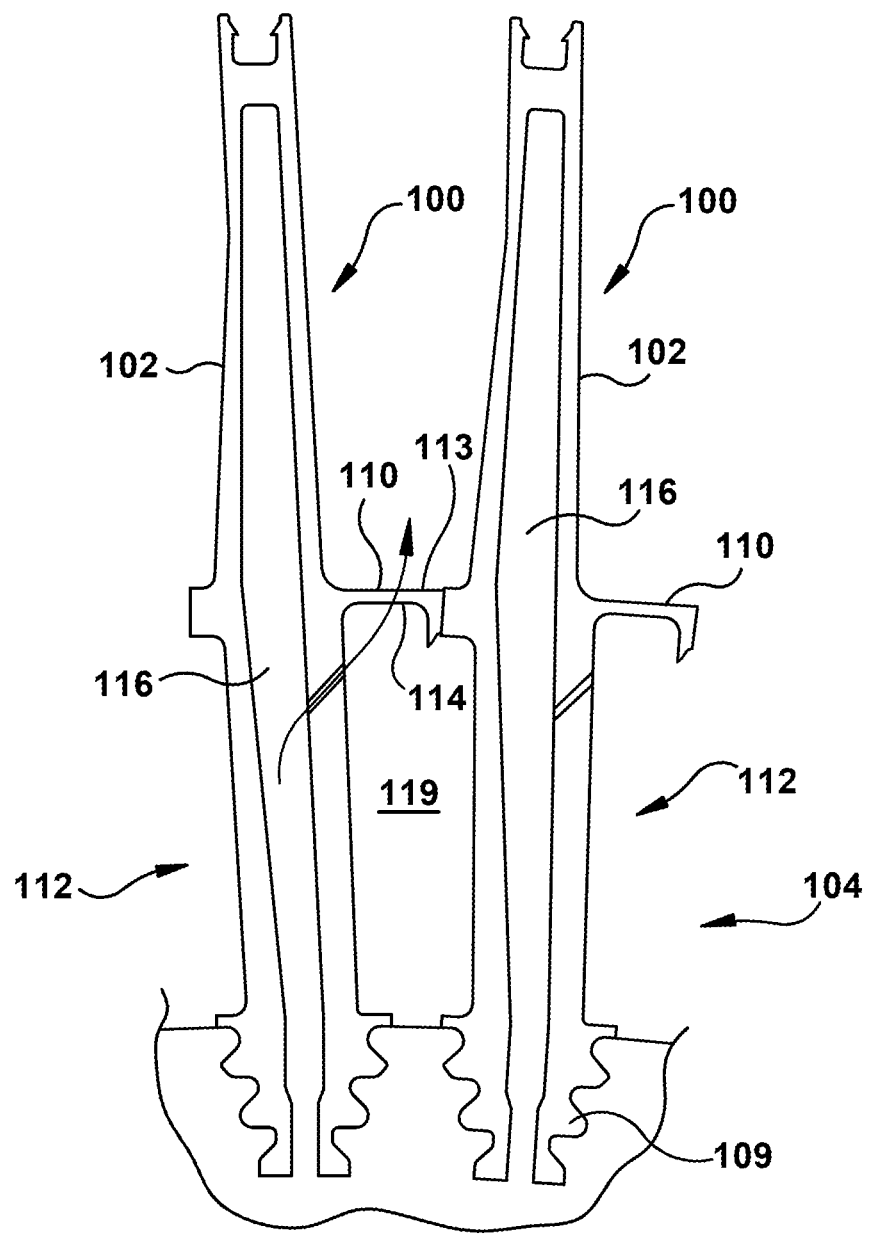
FIG. 3 illustrates a sectional view of neighboring turbine rotor blades having a cooling system according to conventional design.
Figure 4:
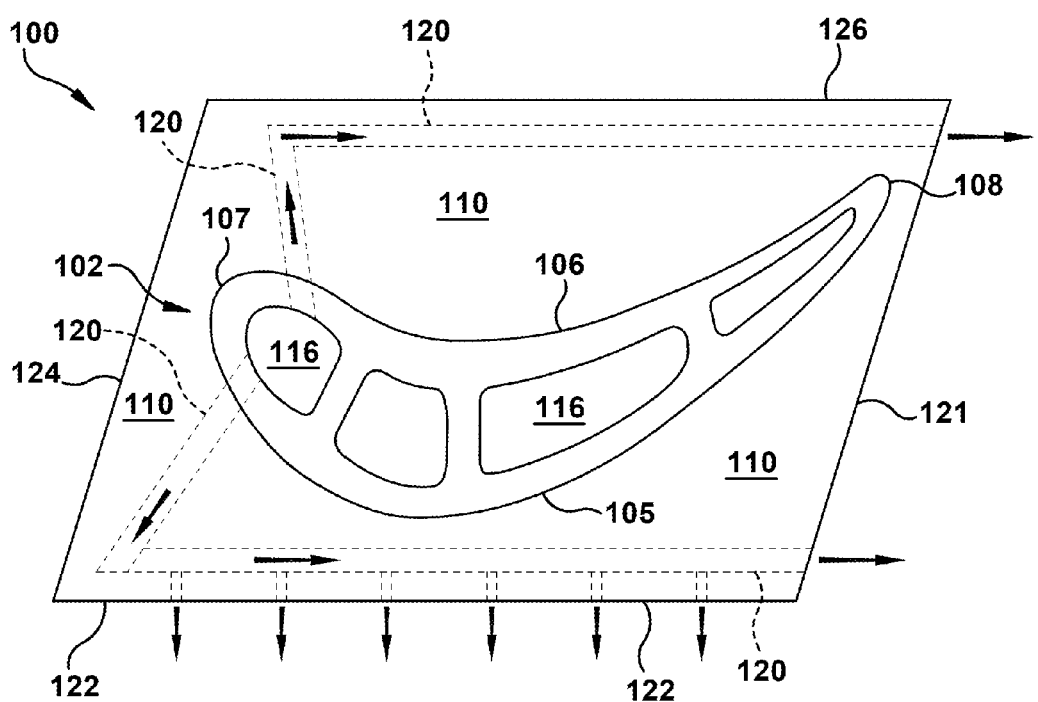
FIG. 4 illustrates a top view of a turbine rotor blade having a platform with interior cooling channels according to conventional design.
Figure 5:
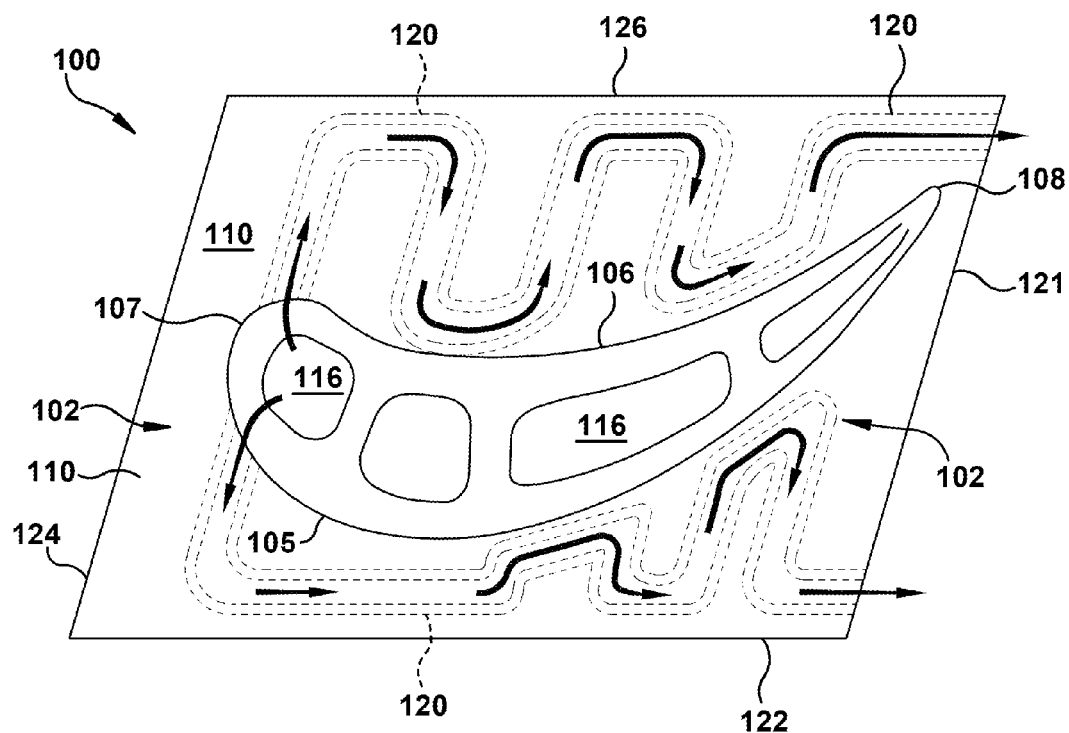
FIG. 5 illustrates a top view of a turbine rotor blade having a platform with interior cooling channels according to an alternative conventional design.
Figure 6:
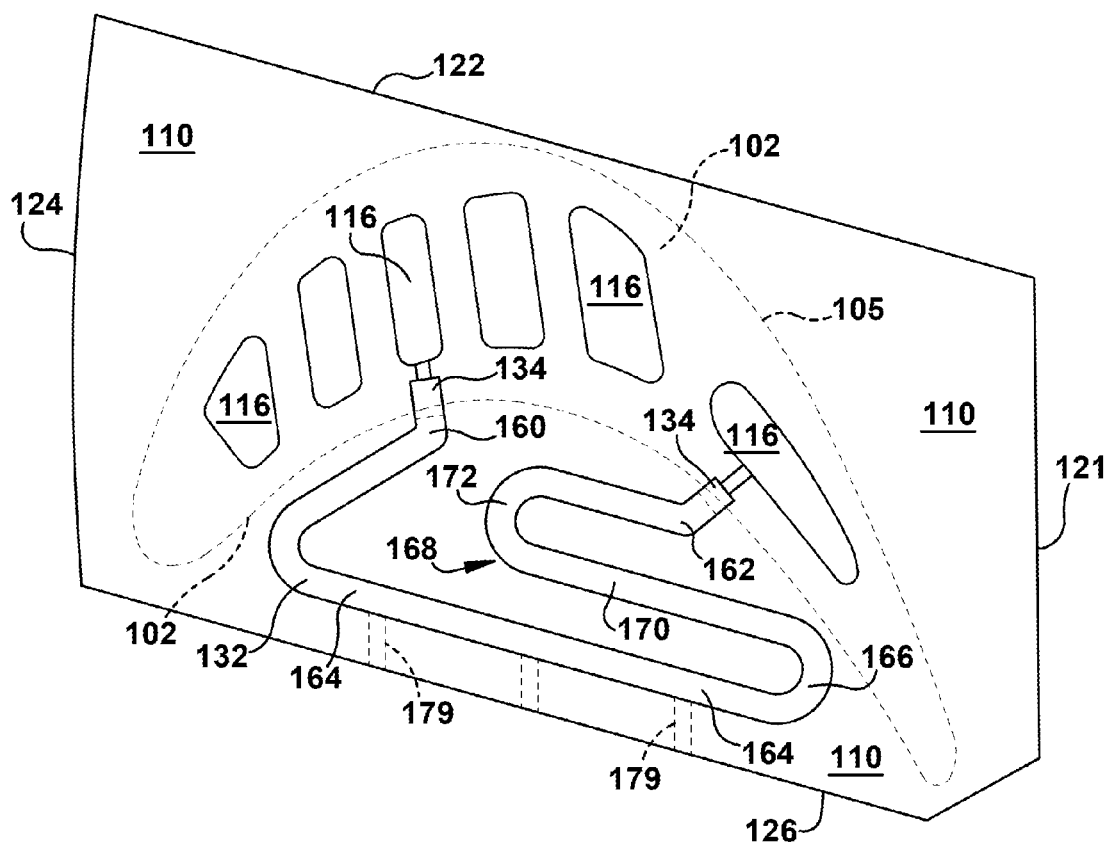
FIG. 6 illustrates a top with partial cross-sectional view of the turbine rotor blade having a configuration of cooling channels according to an embodiment of the present application.

It will be appreciated that turbine blades that are cooled via the internal circulation of a coolant typically include main or interior cooling passage that extends radially outward from the root, through the platform region, and into the airfoil, as described above in relation to several conventional cooling designs. It will be appreciated that certain embodiments of the present invention may be used in conjunction with such interior cooling passages to enhance or enable efficient active platform cooling, and the present invention is discussed in connection with a common design: an interior cooling passage 116 having a winding or serpentine configuration. As depicted in FIG. 6, the serpentine path is typically configured to allow a one-way flow of coolant and includes features that promote the exchange of heat between the coolant and the surrounding rotor blade 100. In operation, a pressurized coolant, which typically is compressed air bled from the compressor (though other types of coolant, such as steam, also may be used with embodiments of the present invention), is supplied to the interior cooling passage 116 through a connection formed through the root 104. The pressure drives the coolant through the interior cooling passage 116, and the coolant convects heat from the surrounding walls.

As the coolant moves through the interior cooling passage 116, it will be appreciated that it loses pressure, with the coolant in the upstream portions of the interior cooling passage 116 having a higher pressure than coolant in downstream portions. As discussed in more detail below, in some embodiments of the present invention, this pressure differential may be used to drive coolant across or through interior cooling passages formed in the platform. It will be appreciated that the present invention may be used in rotor blades 100 having internal interior cooling passages of different configurations and is not limited to interior cooling passages having a serpentine form. Accordingly, as used herein, the term "interior cooling passage" or "cooling passage" is meant to include any passage or hollow channel through which coolant may be circulated in the rotor blade. As provided herein, the interior cooling passage 116 of the present invention extends to at least to the approximate radial height of the platform 116, and may include at least one region of relatively higher coolant pressure (which, hereinafter, is referred to as a "region of high pressure" and, in some cases, may be an upstream section within a serpentine passage) and at least one region of relatively lower coolant pressure (which, hereinafter, is referred to as a "region of low pressure" and, relative to the region of high pressure, may be a downstream section within a serpentine passage).

In general, the various designs of conventional internal interior cooling passages 116 are effective at providing active cooling to certain regions within the rotor blade 100. However, as one of ordinary skill in the art will appreciate, the platform region proves more challenging. This is due, at least in part, to the platform's awkward geometry—i.e., its narrow radial height and the manner in which it juts away from the core or main body of the rotor blade 100. However, given its exposures to the extreme temperatures of hot gas path and high mechanical loading, the cooling requirements of the platform are considerable. As described above, conventional platform cooling designs are ineffective because they fail to address the particular challenges of the region, are inefficient with their usage of coolant, and/or are costly to fabricate.

Referring again to the figures, FIGS. 6 through 9 provide several views of exemplary embodiments of the present invention. As shown, the present invention generally includes a configuration of cooling channels through the interior of a turbine rotor blade 100. The turbine rotor blade may include a platform 110 at an interface between an airfoil 102 and a root 104. The configuration may include an interior cooling passage 116 that is configured to extend from a connection with a coolant source that is made through the root 104 to the interior of the airfoil 102, a platform cooling channel 132 that traverses at least a portion of the platform. As shown, the platform cooling channel 132 may have a serpentine form, though other configurations are possible. The present invention may further included a turndown extension 134 that includes a first section 136, which comprises a connection with the platform cooling channel 132, and a second section 138, which comprises a radially oriented cooling channel. The present invention may further include a connector 140 that extends from a connector opening 142 formed through an outer face of the root 104 to a connection with the interior cooling passage 116 and, therebetween, bisects the second section 138 of the turndown extension 134, as shown.

As stated, the root 104 may include means for connecting it to the rotor wheel, which typically include a dovetail 109 and a shank 112. The connector opening 142 may be formed through the outer face of the shank. The connector opening 142 may be located just inboard of the platform 110. In some embodiments, the connector opening 142 is located in a fillet region formed in the shank that resides just inboard of the platform. As shown, the connector opening 142 may include a plug 144. The plug 144 may be formed to completely block the connector opening 142. From the connector opening 142, the connector 140 may extend diagonally in an outboard direction. At an inner radial end of the second section 138 of the turndown extension 134, the turndown extension 134 may have a dead-end 146.

The platform 110 may have a planar configuration. The longitudinal axis of the platform cooling channel 132 may have an approximate parallel relationship with the plane of the platform 110. The first section 136 of the turndown extension 134 may have an axially/circumferentially oriented cooling channel (i.e., be approximately perpendicular to a radially oriented reference line). The first section 136 may be approximately parallel to the platform cooling channel 132 to which it connects. From the first section 136, the turndown extension 134 may have an approximate 90° elbow transition between the first section 136 and the second section 138.

Figure 7:
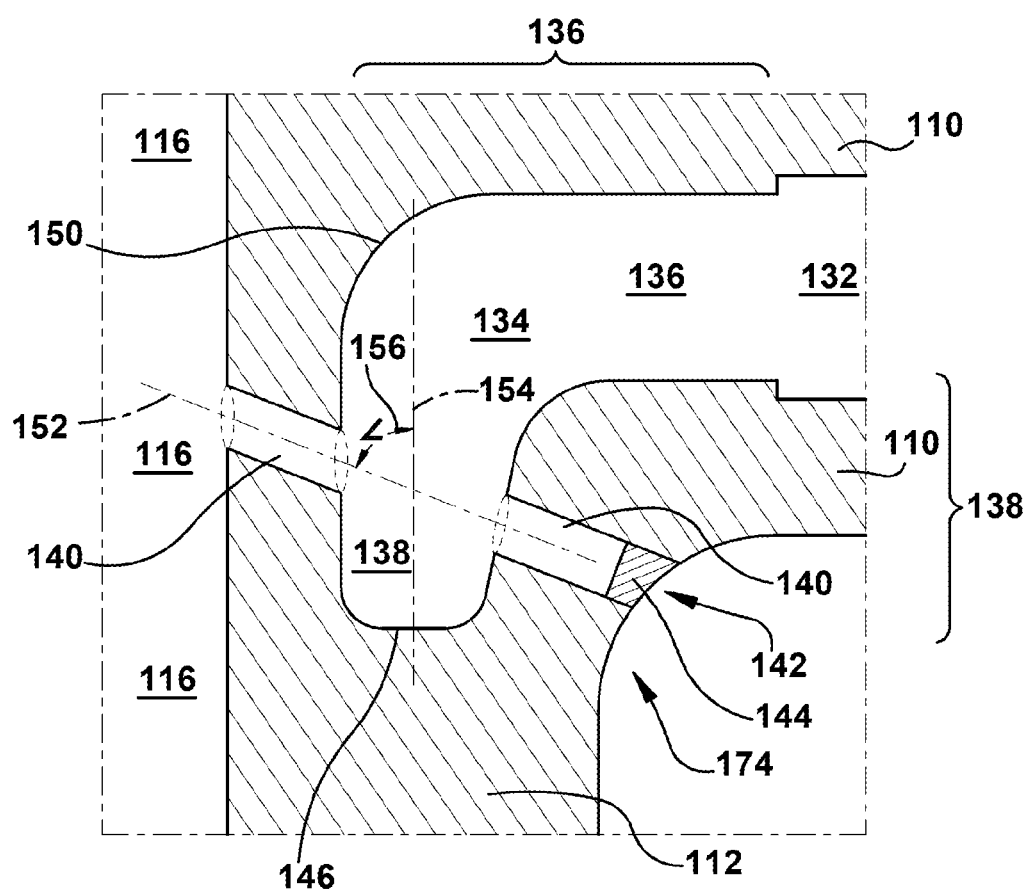
FIG. 7 illustrates a cross-sectional view of the turbine rotor blade having a configuration of cooling channels according to an embodiment of the present application.

The connector 140 may be configured such that it obliquely bisects the second section 138 of the turndown extension 134, and the cross-sectional shape of the connector 140 may be circular. In this manner, the obliquely bisecting connector 140 forms wall openings in the second section 138 that have an elliptical shape. It will be appreciated that this intersection is located in a region that is typically prone to high radial stresses. With the radially oriented major-axis, the elliptical inlet geometry mitigates these typical stress concentrations that arise when creating machined connections between such cores. As indicated in FIG. 7, the connector 140 may be linear and have a longitudinal axis 152. The second section 138 of the turndown extension 134 may also be linear in shape and have a longitudinal axis 154.

As stated, the connector 140 may obliquely bisect the second section 138, which may form an acute angle 156, as shown. It has been determined that if the acute angle 156 falls within certain dimensional ranges performance advantages will be realized. In a preferred embodiment, the acute angle formed between the longitudinal axis 152 of the connector 140 and the longitudinal axis 154 of the second section 138 of the turndown extension 134 falls within the range of between 15° and 75°. More preferable, the acute angle 156 formed between the longitudinal axis 152 of the connector 140 and the longitudinal axis 154 of the second section 138 of the turndown extension 134 is between 30° and 60°. More preferable still, the acute angle 156 formed between the longitudinal axis 152 of the connector 140 and the longitudinal axis 154 of the second section 138 of the turndown extension 134 is approximately 45°.

As stated, the second section 138 may be configured such that it has an approximate radial orientation. In a preferred embodiment, the longitudinal axis 154 of the second section 138 forms an acute angle with a radially oriented reference line of between 30° and −30°. More preferable, the second section 138 is configured such that the longitudinal axis 154 of the second section 138 forms an acute angle with a radially oriented reference line of between 10° and −10°.

In one preferred embodiment, as shown in FIG. 6, the interior cooling passage 116 may be configured such that, in operation, it includes a high-pressure coolant region (or area of relatively higher pressure) and a low-pressure coolant region (or area of relatively lower pressure). In this case, the platform cooling channel 132 may include an upstream end 160 and a downstream end 162, each of which includes a turndown extension 134 positioned in proximity to it. Accordingly, an upstream turndown extension 134 may include a first section 136 that forms a connection with the upstream end 160 of the platform cooling channel 132; and a downstream turndown extension 134 may include a first section 136 that forms a connection with the downstream end 162 of the platform cooling channel 132. A connector 140 may be formed at each of the turndown extensions 134: a high-pressure connector 140 and a low-pressure connector 140. The high-pressure connector 140 may extend from a connector opening 142 formed through an outer face of the shank 112 to a connection with the high-pressure coolant region of the interior cooling passage 116; therebetween, the high-pressure connector 140 may bisect the second section 138 of the upstream turndown extension 134. The low-pressure connector 140 may extend from a connector opening 142 formed through an outer face of the shank 112 to a connection with the low-pressure coolant region of the interior cooling passage 116; therebetween, the low-pressure connector 140 may bisect the second section 138 of the downstream turndown extension 134. The connector openings 142 may be plugged such that coolant is prevented from exiting at that location. In use, it will be appreciated that the pressure differential between the high-pressure connector 140 and the low-pressure connector 140 may drive coolant across the platform cooling channel 132 and through whatever heat exchanging structure it includes.

In one embodiment, the platform cooling channel 132 takes a serpentine form, as illustrated in FIG. 6. As stated above, the airfoil 102 includes a pressure face 106 and a suction face 105. A pressure side of the platform is the side of the platform 110 that corresponds with the pressure side 106 of the airfoil 102, and the pressure side slashface 126 may be the linear edge of the pressure side of the platform 110. In a preferred embodiment, the platform cooling channel 132 may be located primarily through the interior of the pressure side of the platform, as depicted in FIG. 6. In addition, in relation to the forward and aft directions of the turbine rotor blade 100, the upstream end 160 of the platform cooling channel 132 may have a forward position and the downstream end 162 of the channel 132 may have an aft position.

In a preferred embodiment, as illustrated in FIG. 6, the platform cooling channel 132 may have a slashface section 164. The slashface section 164 may be a section of the platform cooling channel 132 that resides in proximity and parallel to the pressure side slashface 126 along a majority of the length of the pressure side slashface 126. The upstream end of the slashface section 164 may reside in proximity to the upstream end of the platform cooling channel 132. It will be appreciated that this configuration, i.e., the positioning of the slashface section 164 in proximity to the upstream end 160 of the platform cooling channel 132, allows this section to receive coolant having the lowest temperature (relative to the other sections of the platform cooling channel 132). As the pressure side slashface 126 is an area having particularly high cooling requirements, this configuration provides performance advantages. From the slashface section 164, the platform cooling channel 132 comprises a first switchback 166 and, downstream of the first switchback 166, an internal section 168 that resides in the central area of the pressure side of the platform. As shown, the internal section 168 may include a linear section 170 immediately downstream of the first switchback 168, and a second switchback downstream of the linear section 170. The second switchback may reside in proximity to the downstream end 162 of the platform cooling channel 132.

In some embodiments, the upstream turndown extension 134 may have a forward position along the pressure side junction between the platform 110 and the shank 112. Relative to the upstream turndown extension 134, the downstream turndown extension 134 may have an aft position along the pressure side junction between the platform 110 and the shank 112. It will be appreciated that, being positioned along the junction of the platform 110 and the shank 112, allows that the connection between the second section 138 of the turndown extension 134 and the interior cooling passage 116 be made via a connector 140 having a relatively short length.

Figure 8:
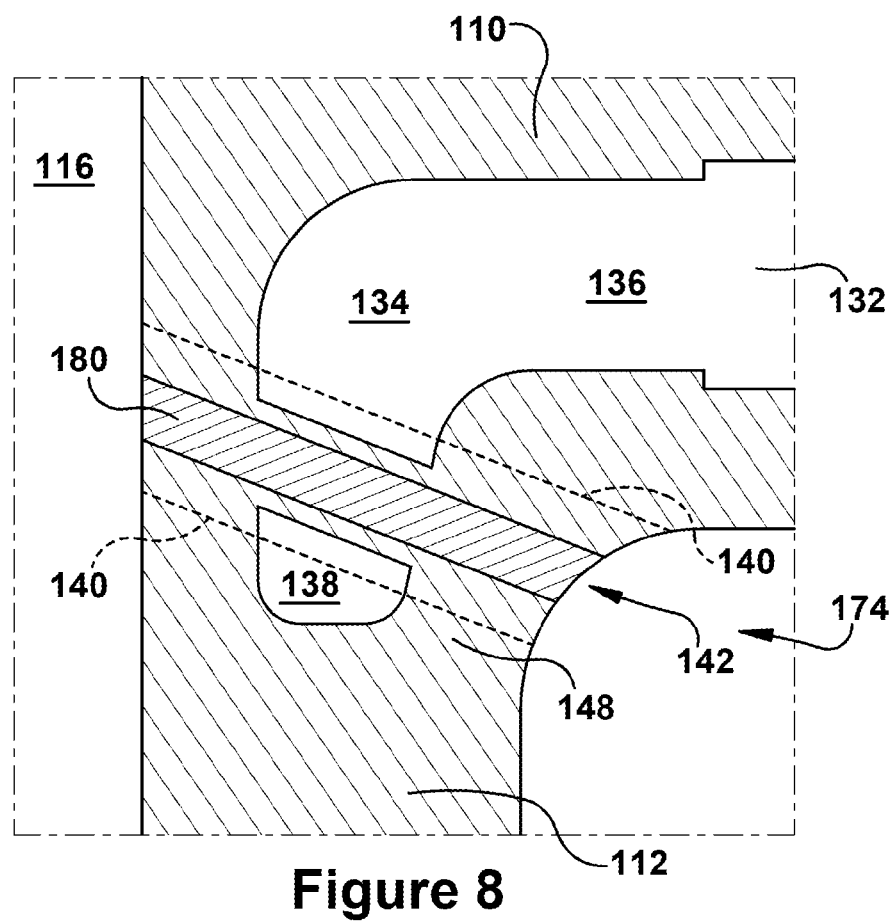
FIG. 8 illustrates a cross-sectional view of a platform cooling channel according to an embodiment of the present application.
Figure 9:
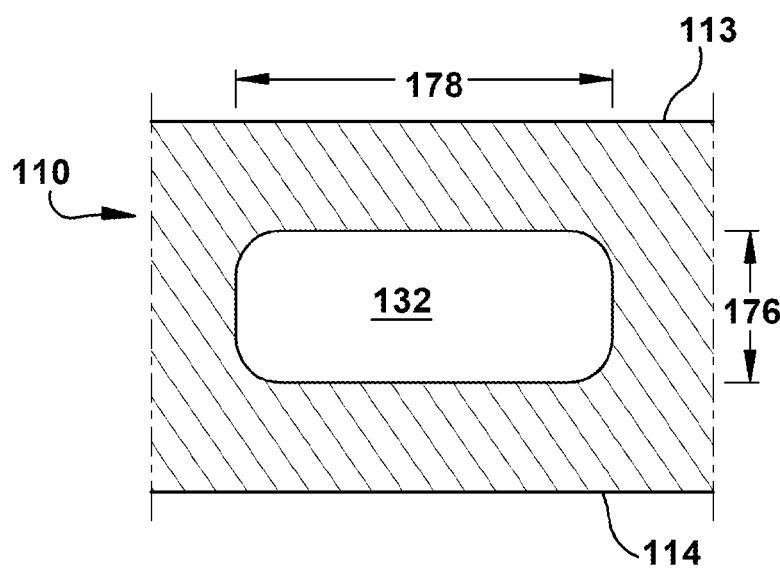
FIG. 9 illustrates a cross-sectional view of the turbine rotor blade having a configuration of cooling channels according to an embodiment of the present application.

As illustrated in FIG. 8, according to the present invention, the platform cooling channel 132 may be configured having certain cross-sectional shape and dimensions that increase heat transfer between the platform and a coolant flowing therethrough. In a preferred embodiment, the platform cooling channel 132 may be substantially rectangular in shape, as indicated in FIG. 8. Fillet regions may be present in the corners of the cross-sectional rectangular shape to reduce stress concentrations and give it an almost oval appearance. The rectangular shape may be configured to have a height 176 in the radial direction and a width 178 in the axial/circumferential directions. In a preferred embodiment, the platform cooling channel 132 may be configured such that the width 178 is greater than the height 176. This may be the case for the entire length of the platform cooling channel 132 or may be applied to the majority of the length. In another preferred embodiment, the platform cooling channel 132 may be configured such that the width 178 is at least greater than twice the height 176. This also may be the case for the entire length of the platform cooling channel 132 or may be applied to the majority of the length. It will be appreciated that, given the planar shape of the platform region, configurations having a greater width 178 increase the available surface area through the platform cooling channel 132, which increases the exchange of heat between the surrounding platform 110 and a coolant flowing through the cooling channel 132.

FIG. 6 illustrates another aspect of the present invention. In some preferred embodiments, one or more cooling apertures 179 may be provided. The cooling apertures 179, as shown, may include small channels that, during operation, releases a desired portion of the coolant flowing through the platform cooling channel 132 from outlets or cooling apertures 179 formed on the platform 110. As shown, the cooling apertures 179, in preferred embodiments, are located on the pressure side slashface 126 or the topside 113 of the platform 110. In regard to the cooling apertures 179 located on the pressure side slashface 126, the cooling apertures 179 may be narrow so that the released coolant is impinged and directed with velocity against the slashface of the adjacent turbine blade 100, which generally increases its cooling effectiveness. It will be appreciated that the slashface cavity and the slashfaces that define them are difficult regions of the platform 110 to cool, and that cooling apertures 179 may be an effective way to do this. The cooling apertures 179 may be sized such that a desired and/or metered flow is achieved.

The present invention further includes a novel method for efficiently forming effective interior cooling channels within the platform region of turbine rotor blades. More specifically, the present invention includes a method of manufacturing a configuration of cooling channels through the interior of a turbine rotor blade. The turbine rotor blade 100 may have a platform 110 at an interface between an airfoil 102 and a root 104. In one preferred embodiments, the method may include the steps of: forming an interior cooling passage 116 that is configured to extend from a connection with a coolant source in the root 104 to the interior of the airfoil 102; forming a platform cooling channel 132 that traverses at least a portion of the platform 110; forming a turndown extension 134 that comprises a first section 136, which forms a connection with the platform cooling channel 132, and a second section 138, which comprises a radially oriented cooling channel; and forming a connector 140 that extends from a connector opening 142 formed through an outer face of the root 104 to a connection with the interior cooling passage 116 and, therebetween, bisects the second section 138 of the turndown extension 134. The forming of the turndown extension 134 may include a casting process. A casting process may also be used to form the interior cooling passage 116 and the platform cooling channels 132. The core used to form the interior cooling passage 116 and the core used to form both the platform cooling channels 132 may be unconnected while being formed by the casting process, which, as stated above, may be advantageous. The connector 140 then may be formed after the turndown extension 134 and interior cooling passage 116 is formed.

Given the possible configurations discussed, the forming the connector 140 may be completed with a relatively uncomplicated and cost-effective line-of-sight machining process. In one preferred embodiment, as shown in FIG. 7, a guide rod 180 may be positioned during the casting process that serves to guide the post-cast machining, which may be a mechanical drilling process, of the connector 140. It will be appreciated that the dashed lines in FIG. 7 represent the ultimate configuration of the connector 140 once the machining process is completed. Given this geometry, the connector 140 may be efficiently formed with a single pull plane machining operation. A plug 144 may be installed to complete the cooling channel configuration. The plug 144 may be installed within the connector opening 142 using conventional methods, such as through mechanical interference, welding, brazing, etc. It will be appreciated that these several steps may be used to create the several alternative embodiments discussed above.

In operation, according to an exemplary embodiment of the present application, a coolant may enter the interior cooling passage 116 through a forward area of the dovetail 109 and, after being directed into the airfoil 102, flow radially outward/inward through a serpentine-configured interior cooling passage 116 as the coolant meanders in an aftwise direction. As shown, the high-pressure connector 140 may be configured such that an upstream (and higher pressure) portion of the interior cooling passage 116 fluidly communicates with an upstream turndown extension 134, which then directs the coolant into the upstream end 160 of the platform cooling channel 132. The low-pressure connector 140 may be configured such that a downstream (and lower pressure) portion of the interior cooling passage 116 fluidly communicates with a downstream turndown extension 134. The downstream turndown extension 134 may collect coolant exiting the platform cooling channel 132 and return the coolant to the interior cooling passage 116, where the coolant may be used in other downstream cooling applications and/or exhausted through cooling apertures located elsewhere on the rotor blade.

In this manner, the platform cooling arrangement of the present invention may extracts a portion of the coolant from the interior cooling passage 116, use the coolant to remove heat from the platform 110, and then return the coolant to the interior cooling passage 116, where the coolant may be used further. It will be appreciated that the present invention accomplishes this while being efficient and cost-effective to manufacture, and while maintaining the structural integrity of the rotor blade. The separation of the platform core and the main core during the casting process, according to certain preferred embodiments described above, provide other performance advantages and efficiencies during the casting process.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A configuration of cooling channels through the interior of a turbine rotor blade, the turbine rotor blade including a platform at an interface between an airfoil and a root, the configuration of cooling channels comprising:
    an interior cooling passage that is configured to extend from a connection with a coolant source in the root to the interior of the airfoil;
    a platform cooling channel that traverses at least a portion of the platform;
    a turndown extension that includes a first section, which comprises a connection with the platform cooling channel, and a second section, which comprises a radially oriented cooling channel; and
    a connector that extends from a connector opening formed through an outer face of the root to a connection with the interior cooling passage and, therebetween, bisects the second section of the turndown extension.

2. The configuration of cooling channels through the interior of a turbine rotor blade according to claim 1, wherein the root comprises connecting means and, between the connecting means and the platform, a shank; and wherein the connector opening is formed through the outer face of the shank; and
    wherein, from the connector opening, the connector extends diagonally in an outboard direction.

3. The configuration of cooling channels through the interior of a turbine rotor blade according to claim 1, wherein:
    the connector opening comprises a plug,
    at an inner radial end of the second section of the turndown extension, the turndown extension comprises a dead-end; and
    the connector opening is located just inboard of the platform.

4. The configuration of cooling channels through the interior of a turbine rotor blade according to claim 1, wherein the platform comprises a planar configuration; and wherein the longitudinal axis of the platform cooling channel comprises an approximate parallel relationship with the plane of the platform; and
    wherein the connector opening is located in a fillet region formed in the shank that resides just inboard of the platform.

5. The configuration of cooling channels through the interior of a turbine rotor blade according to claim 1, wherein the first section of the turndown extension comprises an axially/circumferentially oriented cooling channel; and
    wherein the turndown extension comprises an approximate 90° elbow transition between the first section and the second section.

6. The configuration of cooling channels through the interior of a turbine rotor blade according to claim 1, wherein the connector obliquely bisects the second section of the turndown extension.

7. The configuration of cooling channels through the interior of a turbine rotor blade according to claim 6, wherein the cross-sectional shape of the connector is approximately circular in shape and configured such that the oblique bisecting forms wall openings in the second section that comprise an elliptical shape, the elliptical shape comprising a major axis approximately aligned to the radial direction.

8. The configuration of cooling channels through the interior of a turbine rotor blade according to claim 1, wherein the connector is linear and comprises a longitudinal axis;
    wherein the second section of the turndown extension is linear and comprises a longitudinal axis; and
    wherein the second section of the turndown extension and the connector are configured such that, upon bisecting, the acute angle formed between the longitudinal axis of the connector and the longitudinal axis of the second section of the turndown extension comprises between 15° and 75°.

9. The configuration of cooling channels through the interior of a turbine rotor blade according to claim 1, wherein the connector is linear and comprises a longitudinal axis;
    wherein the second section of the turndown extension is linear and comprises a longitudinal axis; and
    wherein the second section of the turndown extension and the connector are configured such that, upon bisecting, the acute angle formed between the longitudinal axis of the connector and the longitudinal axis of the second section of the turndown extension comprises between 30° and 60°.

10. The configuration of cooling channels through the interior of a turbine rotor blade according to claim 1, wherein the connector is linear and comprises a longitudinal axis;
    wherein the second section of the turndown extension is linear and comprises a longitudinal axis; and
    wherein the second section of the turndown extension and the connector are configured such that, upon bisecting, the acute angle formed between the longitudinal axis of the connector and the longitudinal axis of the second section of the turndown extension comprises approximately 45°.

11. The configuration of cooling channels through the interior of a turbine rotor blade according to claim 8, wherein the second section is configured such that a longitudinal axis of the second section forms an acute angle with a radially oriented reference line of between 30° and −30°.

12. The configuration of cooling channels through the interior of a turbine rotor blade according to claim 8, wherein the second section is configured such that a longitudinal axis of the second section forms an acute angle with a radially oriented reference line of between 10° and −10°.

13. The configuration of cooling channels through the interior of a turbine rotor blade according to claim 2, wherein, in operation, the interior cooling passage comprises a high-pressure coolant region and a low-pressure coolant region;
    wherein the platform cooling channel comprises an upstream end and a downstream end;
    wherein the cooling channel configuration comprises a turndown extension at each end of the platform cooling channel: an upstream turndown extension, the first section of which forms a connection with the upstream end of the platform cooling channel; and a downstream turndown extension, the first section of which forms a connection with the downstream end of the platform cooling channel;
    wherein the cooling channel configuration comprises a connector at each of the turndown extensions: a high-pressure connector and a low-pressure connector;
    wherein the high-pressure connector extends from a connector opening formed through an outer face of the shank to a connection with the high-pressure coolant region of the interior cooling passage and, therebetween, bisects the second section of upstream turndown extension; and wherein the low-pressure connector extends from a connector opening formed through an outer face of the shank to a connection with the low-pressure coolant region of the interior cooling passage and, therebetween, bisects the second section of downstream turndown extension.

14. The configuration of cooling channels through the interior of a turbine rotor blade according to claim 13, wherein the platform cooling channel comprises a serpentine form;

the airfoil comprises a pressure side and a suction side, and a pressure side of the platform comprises the side of the platform that corresponds with the pressure side of the airfoil, and the pressure side slashface comprises a linear edge of the pressure side of the platform; and the platform cooling channel is located primarily through the interior of the pressure side of the platform.

15. The configuration of cooling channels through the interior of a turbine rotor blade according to claim 14, wherein, in relation to the forward and aft directions of the turbine rotor blade, the upstream end of the platform cooling channel comprises a forward position and the downstream end of the platform cooling channel comprises an aft position;

wherein the platform cooling channel comprises a slashface section, the slashface section comprising a section of the platform cooling channel that resides in proximity and parallel to the pressure side slashface along a majority of the length of the pressure side slashface; and wherein the upstream end of the slashface section resides in proximity to the upstream end of the platform cooling channel.

16. The configuration of cooling channels through the interior of a turbine rotor blade according to claim 15, wherein, from the slashface section, the platform cooling channel comprises a first switchback and, downstream of the first switchback, an internal section that resides in the central area pressure side of the platform;

wherein the internal section includes a linear section immediately downstream of the first switchback and a second switchback downstream of the linear section; and wherein the second switchback resides in proximity to the downstream end of the platform cooling channel.

17. The configuration of cooling channels through the interior of a turbine rotor blade according to claim 13, wherein the upstream turndown extension comprises a forward position along the pressure side junction between the platform and the shank; and wherein the downstream turndown extension comprises an aft position along the pressure side junction between the platform and the shank.

18. The configuration of cooling channels through the interior of a turbine rotor blade according to claim 13, wherein the platform cooling channel comprises a height and a width;

wherein the height comprises the radial height of the platform cooling channel;

wherein the width comprises the axial/circumferential width across the platform cooling channel;

wherein a majority of the platform cooling channel is configured such that the width is greater than the height.

19. The configuration of cooling channels through the interior of a turbine rotor blade according to claim 18, wherein substantially all of the platform cooling channel is configured such that the width is at least greater than twice the height.

20. A method of manufacturing a configuration of cooling channels through the interior of a turbine rotor blade, the turbine rotor blade having a platform at an interface between an airfoil and a root, the method comprising the steps of:

forming an interior cooling passage that is configured to extend from a connection with a coolant source in the root to the interior of the airfoil;

forming a platform cooling channel that traverses at least a portion of the platform;

forming a turndown extension that comprises a first section, which forms a connection with the platform cooling channel, and a second section, which comprises a radially oriented cooling channel; and forming a connector that extends from an opening formed through an outer face of the root to a connection with the interior cooling passage and, therebetween, bisects the second section of the turndown extension.

21. The method according to claim 20, wherein the step of forming of the turn down extension includes a casting process;

wherein the connector is formed after the turn down extension; and wherein the forming the connector comprises a single pull plane machining process.

22. The method according to claim 21, wherein the step of forming of the turn down extension includes positioning a guide rod in a predetermined location that coincides with the intended machining path in the forming of the connector;

wherein the step of forming the connector includes using the guide rod to guide the machining process.

23. The method according to claim 21, wherein the root comprises connecting means and, between the connecting means and the platform, a shank;

wherein the connector is machined from a start position that is located on the outer face of the shank and just inboard of the platform;

wherein the connector extends diagonally in an outboard direction for the start position;

further comprising the step of plugging the connector with a plug such that the plug resides in proximity to the outer surface of the shank.

24. The method according to claim 21, wherein the connector is linear and comprises a longitudinal axis;

wherein the second section of the turndown extension is linear and comprises a longitudinal axis; and wherein the second section of the turndown extension and the connector are formed such that, upon bisecting, the acute angle formed between the longitudinal axis of the connector and the longitudinal axis of the second section of the turndown extension comprises between 30° and 60°.

25. The method according to claim 24, wherein the second section is configured such that a longitudinal axis of the second section forms an acute angle with a radially oriented reference line of between 10° and −10°.

26. The method according to claim 21, wherein the interior cooling passage is formed such that, in operation, it comprises a high-pressure coolant region and a low-pressure coolant region;

wherein the platform cooling channel is formed to include an upstream end and a downstream end;

wherein a turndown extension is formed at each end of the platform cooling channel: an upstream turndown extension, the first section of which forms a connection with the upstream end of the platform cooling channel; and a downstream turndown extension, the first section of which forms a connection with the downstream end of the platform cooling channel;

wherein a connector is formed at each of the turndown extensions: a high-pressure connector and a low-pressure connector;

wherein the high-pressure connector extends from an opening formed through an outer face of the shank to a connection with the high-pressure coolant region of the interior cooling passage and, therebetween, bisects the second section of upstream turndown extension; and wherein the low-pressure connector extends from an opening formed through an outer face of the shank to a connection with the low-pressure coolant region of the interior cooling passage and, therebetween, bisects the second section of downstream turndown extension.

* * * * *